US011088834B2

(12) United States Patent
Freudiger et al.

(10) Patent No.: US 11,088,834 B2
(45) Date of Patent: Aug. 10, 2021

(54) SYSTEM FOR PRIVACY-PRESERVING MONETIZATION OF BIG DATA AND METHOD FOR USING THE SAME

(71) Applicant: Palo Alto Research Center Incorporated, Palo Alto, CA (US)

(72) Inventors: Julien Freudiger, Mountain View, CA (US); Shantanu Rane, Menlo Park, CA (US); Alejandro E. Brito, Mountain View, CA (US); Ersin Uzun, Campbell, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 846 days.

(21) Appl. No.: 14/698,678

(22) Filed: Apr. 28, 2015

(65) Prior Publication Data
US 2016/0323102 A1 Nov. 3, 2016

(51) Int. Cl.
*H04L 9/08* (2006.01)
*G06F 21/62* (2013.01)
*G06Q 30/02* (2012.01)

(52) U.S. Cl.
CPC ........ *H04L 9/0841* (2013.01); *G06F 21/6245* (2013.01); *G06F 21/6254* (2013.01); *G06Q 30/0201* (2013.01); *H04L 9/0869* (2013.01); *H04L 2209/16* (2013.01); *H04L 2209/24* (2013.01)

(58) Field of Classification Search
CPC .............. G06Q 30/0201; G06Q 50/01; H04L 2209/16; H04L 29/06; G06F 17/3034
See application file for complete search history.

(56) References Cited

U.S. PATENT DOCUMENTS 6,003,040 A * 12/1999 Mital ..................... G06F 16/94
717/165
6,078,926 A * 6/2000 Jensen ................ G06F 16/2448
8,112,449 B2 * 2/2012 Casey ............... G06F 17/30017
379/413.02

(Continued)

OTHER PUBLICATIONS

"Privacy-Preserving Group Data Access via Stateless Oblivious RAM Simulation", by Goodrich et al., Department of Computer Science, University of California, Irvine, May 20, 2011. (Year: 2011).*

(Continued)

*Primary Examiner* — Pan G Choy
(74) *Attorney, Agent, or Firm* — Krista A. Wittman (57) ABSTRACT

The current invention provides a system and method for Data Owners to share with Data Seekers extracted insights from the Big Data, instead of raw data or anonymized raw data, thus reducing or eliminating privacy concerns on the data owned by the Data Owners. An Oblivious Pseudo Random Function (OPRF) is used, with operations using OPRFs occur over encrypted data, thus Data Owners learn only the primary object from Data Seeker and nothing else about the remainder of Data Owners' data. Similarly, Data Seeker learns a list of associated secondary objects and nothing else about Data Owners' data. The extent of sharing can be limited using a predefined threshold depending how much private information Data Owner is willing to share or Data Seeker is willing to pay.

18 Claims, 4 Drawing Sheets

(56) References Cited

U.S. PATENT DOCUMENTS

| | | | | |
|---|---|---|---|---|
| 8,997,248 | B1* | 3/2015 | McKay | H04L 63/0428<br>726/27 |
| 9,025,767 | B2* | 5/2015 | Sovio | H04L 9/083<br>380/30 |
| 9,672,537 | B1* | 6/2017 | Dietrich | G06Q 30/0271 |
| 2002/0161561 | A1* | 10/2002 | Sarma | G06Q 10/04<br>703/2 |
| 2004/0093331 | A1* | 5/2004 | Garner | A61P 25/06 |
| 2004/0123112 | A1* | 6/2004 | Himmel | G06F 21/6209<br>713/182 |
| 2004/0193388 | A1* | 9/2004 | Outhred | G06F 8/65<br>703/1 |
| 2005/0002532 | A1* | 1/2005 | Zhou | H04L 9/302<br>380/277 |
| 2006/0245587 | A1* | 11/2006 | Pinkas | H04L 9/085<br>380/28 |
| 2007/0106629 | A1* | 5/2007 | Endacott | G06N 5/025<br>706/47 |
| 2007/0220614 | A1* | 9/2007 | Ellis | G06F 21/6245<br>726/27 |
| 2007/0270983 | A1* | 11/2007 | Yasui | F02D 35/023<br>700/31 |
| 2008/0114687 | A1* | 5/2008 | Watanabe | G06F 21/10<br>705/51 |
| 2008/0275829 | A1* | 11/2008 | Stull | H04L 9/00<br>706/17 |
| 2010/0100551 | A1* | 4/2010 | Knauft | G06F 16/313<br>707/741 |
| 2011/0202755 | A1* | 8/2011 | Orsini | H04L 63/029<br>713/151 |
| 2011/0252040 | A1* | 10/2011 | Li | G06F 17/30911<br>707/748 |
| 2011/0296186 | A1* | 12/2011 | Wong | H04L 63/0272<br>713/171 |
| 2012/0179905 | A1* | 7/2012 | Ackerly | G06F 21/6209<br>713/155 |
| 2012/0311676 | A1* | 12/2012 | Ibasco | H04L 61/1594<br>726/4 |
| 2013/0138670 | A1* | 5/2013 | Ludwig | G06F 16/48<br>707/758 |
| 2013/0246802 | A1* | 9/2013 | Kerschbaum | H04L 9/00<br>713/189 |
| 2013/0318347 | A1* | 11/2013 | Moffat | H04L 9/0894<br>713/168 |
| 2015/0134960 | A1* | 5/2015 | Garcia Morchon | H04L 9/0847<br>713/171 |
| 2015/0161410 | A1* | 6/2015 | Andersen | H04L 63/061<br>713/165 |
| 2015/0237021 | A1* | 8/2015 | Sovio | G06F 16/951<br>713/168 |
| 2016/0085996 | A1* | 3/2016 | Eigner | G06F 21/6227<br>713/193 |
| 2016/0104004 | A1* | 4/2016 | Vadapandeshwara | G06F 21/604<br>726/1 |

OTHER PUBLICATIONS

"A Method for Obtaining Digital Signatures and Public-Key Cryptosystems", by R. L. Rivest, A. Shamir, and L. Adleman, MIT Laboratory for Computer Science and Department of Mathematics, 545 Technology Square, Cambridge, MA 02139, ACM 0001-0782/78/0200-0120, 1978. (Year: 1978).*

"Practical Private Set Intersection Protocols with Linear Complexity", by Emiliano De Cristofaro and Gene Tsudik, University of California, Irvine, LNCS 6052, pp. 143-159, IFCA/Springer-Verlag Berlin Heidelberg, 2010. (Year: 2010).*

Carmit Hazay et al.: "Efficient Set Operations in the Presence of Malicious Adversaries," Journal of Cryptology, Springer-Verlag, NE, vol. 25, No. 3, Mar. 1, 2011, pp. 383-433, XP035025349, ISSN: 1432-1378.

Michael J Freedman et al.: "Efficient Private Matching and Set Intersection," Apr. 23, 2004, Advances in Cryptology—Eurocrypt 2004; [Lecture Notes in Computer Science; LNCS], Springer-Verlag, Berlin/Niedelberg, pp. 1-19, XP019005014, ISBN: 978-3-540-21935-4.

Emiliano De Cristofaro et al.: "Practical Private Set Intersection Protocols with Linear Complexity," Jan. 25, 2010, Financial Cryptography and Data Security, Springer Berlin Heidelberg, Berlin, Heidelberg, pp. 143-159, XP019147488, ISBN: 978-3-642-14576-6.

De Cristofaro, E. and Tsudik, G., Practical Private Set Intersection Protocols with Linear Computational and Bandwidth Complexity. IACR Cryptology ePrint Archive, 2009, p. 491.

* cited by examiner

SYSTEM FOR PRIVACY-PRESERVING MONETIZATION OF BIG DATA AND METHOD FOR USING THE SAME

This application relates in general to a computing system and method for controlled information release, in particular, to a computer-implemented system and method for monetizing big data without breaching privacy of data owner and data seeker.

BACKGROUND

Big Data usually includes data sets with sizes beyond the ability of commonly used software tools to capture, curate, manage, and process within a tolerable elapsed time. Big Data "size" is a constantly moving target, as of 2012 ranging from a few dozen terabytes to many petabytes of data. In addition to size or volume (amount of data), Big Data also contends with velocity (speed of data in and out) and variety (range of data types and sources). Despite the challenges, Big Data is hotly pursued because Big Data promise to obtain fuzzy measurements, detect trends, reveal correlations, uncover dependencies, and perform predictions of outcomes and behaviors, all of which are termed insights for the purpose of this application.

For example, industries have developed a wide range of business intelligence insights, including psychological profiles of employees, shopping habits, and user mobility profiles. These insights offer a competitive edge for data owners, but challenges, especially in data analysis and sharing, exist before full scale commercialization of the Big Data can be realized. The challenges include data curation, search, data sharing, storage, transfer, visualization, and privacy preservation.

A bright growth area is the commercialization of insights obtained from Big Data with other parties interested in the insights. A vibrant market for insight commercialization benefits both data owners and data seekers. The advent of cloud computing has provided an infrastructure for on-demand computing power, and computer-aided analytics has gained momentum. By attracting further expenditure, experience, and experimentation, the commercialization of insights may provide a necessary push that elevates Big Data from promise into day-to-day reality.

The largest hurdle preventing a successful implementation of commercialization of such insights is privacy concerns. Foremost, there are Constitutional and statutory restrictions on privacy that limit collection of personal data and sharing without consent. There are also competitive concerns that limit data sharing. For example, companies may not wish to share sensitive data about their customers or their practices and may wish to keep valuable information to themselves. Furthermore, the prospect of data sharing could be detrimental to companies' reputation and bottom line, creating customer alienation or exodus. Therefore, the challenge before achieving a successful commercialization environment hinges on solving the privacy and competition issues.

Currently, insights from Big Data typically are jealously guarded by owners and not shared with other parties. Even when the owners are willing to monetize such data, a lack of technological solutions often prevents the information dissemination. For example, cellular carriers have been collecting mobility and communication data for over 20 years and accumulated a treasure trove of data and potential insights; but have difficulty in monetizing their data and potential insights with others.

Some solutions have been proposed to overcome the privacy hurdle without curtailing or diluting the Constitutional right to privacy. These proposed solutions include anonymizing insights, obfuscating the acquired data models, and limiting the scope or views of the datasets. Such solutions include differential privacy and k-anonymity, both of which attempt to alleviate the privacy concern by anonymizing a portion of data without unduly diminishing data resolution.

An inescapable drawback of anonymization is the reduction of the data quality. Thus, differential privacy and k-anonymity must tradeoff between privacy and utility and do not achieve simultaneous optimal states for both data resolution and privacy. Worse yet, privacy concerns are not entirely eliminated even with the sacrifice of data resolution, because de-anonymization can be performed by another party. For example, previous reports showed that anonymization can be reverted by combining an anonymized dataset with publicly available databases. Thus, a superior approach would be one that is based on operations on encrypted data that seek to preserve data resolution and eliminate privacy concerns.

In addition to privacy, the competition issue requires ability for controlled, graded, and targeted release of data. In particular, a solution is needed that allows data owners to release only small portions of data and preserve the value of the database; and data seekers to acquire only relevant data and save cost.

Previous work suggested a solution involving centralized computations over big data, with several parties each contributing part of their data and trusting a centralized party for privacy protection. In this approach, data privacy preservation is predicated on the centralized party keeping each party from knowing others' data. The implementation of this concept remains a challenge. For example, one approach is to employ a third party that functions as a data depository or data analysis unit, relying on the third party to keep data private. This approach is problematic because the independence of the third party is often questionable, the cost of setting up the third party is high, and analysis performed by the third party often lacks the relevance and expertise of the in-house analysis. Thus employing a third party is costly, cumbersome, slow, unresponsive, and increases rather than decreasing privacy concerns.

Therefore, there remains a need for monetizing Big Data without sacrificing privacy and with a controlled data release mechanism; ideally in a manner that allows data owners and data seekers to interact directly. A further need remains for a system and a method to allow data access in a privacy preserving manner without reducing the value of the data, especially system and method that allow an owner to control the level of data sharing in a privacy preserving manner, while allowing data seekers to keep their own data and the extent of inquiry private from the owner.

SUMMARY

A system and method for Data Owners to share with Data Seekers extracted insights from Big Data, instead of raw data or anonymized raw data, thus reducing or eliminating privacy concerns on the data owned by the Data Owners. Data Owners acquire insights through analyzing data. For example, insights can be the association relationship between one object, merchandise, service, event, or occurrence, to another object, merchandise, service, event, or occurrence. An oblivious Pseudo Random Function (OPRF) is used, with operations occurring over encrypted data. With this approach, Data Seeker learns a list of associated objects and nothing else about Data Owners' data and data structure. Similarly, Data Owners learn only the primary object from Data Seekers and nothing else about the remainder of Data Seekers' data. The extent of sharing can be limited by selecting some insights to share using a predefined privacy threshold depending how much private information a Data Owner is willing to share or Data Seeker is willing to pay for.

One embodiment provides a computer-implemented method for privacy-preserving insight sharing. A Data Owner or Insight Provider receives from a Data Seeker or Insight Seeker an identity of a primary object and an obfuscated list of secondary objects. The Data Owner modifies the obfuscated list of the secondary objects to create a modified obfuscated list of the secondary objects. The Data Owner transmits to the requesting party the modified obfuscated list of the secondary objects. Furthermore, the Data Owner computes at least one association relationship between the primary object and associated objects to obtain a list of insights. The Data Owner can select the list of the insights, such as setting a threshold, to obtain a selected list of the insights. The Data Owner obfuscates the selected list of the insights to obtain an obfuscated selected list of the insights. The Data Owner transmits the obfuscated selected list of the insights to the requesting party. Finally, an intersection is found between the modified obfuscated list of the secondary objects and the obfuscated selected list of the insights, through the comparison of the two obfuscated lists.

A further embodiment provides a computer-implemented system for privacy-preserving insight sharing. The system includes a receiving module configured to receive an identity of a primary object and an obfuscated list of secondary objects from a requesting party; an encryption module configured to modify the obfuscated list of the secondary objects to create a modified obfuscated list of the secondary objects; a sharing module configured to transmit to the requesting party the modified obfuscated list of the secondary objects; an insight computing module configured to compute at least one association relationship between the primary object and associated objects to obtain a list of insights; a threshold module configured to select the list of the insights to obtain a selected list of the insights; the encryption module further configured to obfuscate the selected list of the insights to obtain an obfuscated selected list of the insights; the sharing module further configured to transmit the obfuscated selected list of the insights to the requesting party; and a comparison module configured to provide an intersection between the modified obfuscated list of the secondary objects and the obfuscated selected list of the insights through comparing the modified obfuscated list of the secondary objects and the obfuscated selected list of the insights.

Other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Infrastructure

Figure 1:
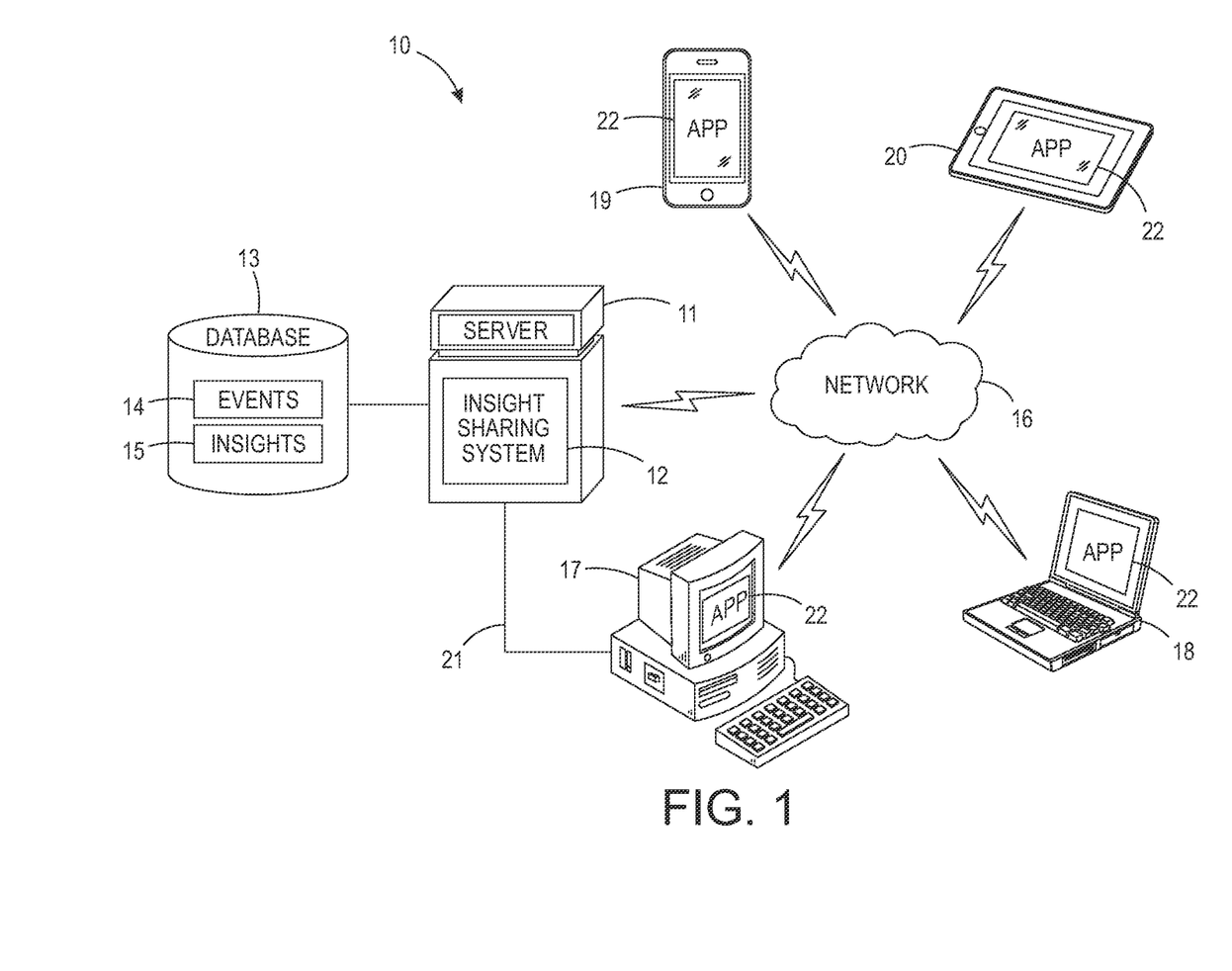
FIG. 1 is a functional block diagram showing, by way of example, a privacy-preserving insight sharing system 10, including a server 11 in accordance with one embodiment.

Data Owner (DO) can provide targeted recommendations through a privacy-preserving insight sharing system usable by a Data Seeker (DS) that wants to purchase recommendations from Data Owner. The system can include insight sharing software installed in a server of the Data Owner and client software installed in devices of the Data Seeker. FIG. 1 is a functional block diagram showing, by way of example, a privacy-preserving insight sharing system 10, including a server 11 in accordance with one embodiment, upon which an insight sharing system 12 is installed on the server 11. The server 11 may comprise one or more central processing units (CPUs); a high-speed, short-term data storage means; an input-output or bus controller; a lower-speed, permanent or semi-permanent data storage means; and an operating system software or operating environment. The insight sharing system is connected to a database that stores a collection of Big Data including events and associations of the events. The insight sharing system 12 can be connected to devices including a desktop computer 17, a laptop computer 18, a smart phone 19, or a tablet 20. Other devices are possible. The server 11, database, desktop computer 17, laptop computer 18, smartphone 19, tablet 20, and the other devices may be connected over the network 16, which could be a local area network, enterprise network, or wide area network, including the Internet and cellular network, or some combination thereof. The server 11 may also be connected to the desktop computer 17 through a hard link 21. The client software 22, or App 22, can be installed in a terminal accessible to users, including the desktop computer 17, laptop computer 18, smartphone 19, tablet 20, and other devices. Other configurations are possible.

Insights are events or behavior patterns gleaned from data such as Big Data. Specifically, events or behaviors patterns are associations, both positive and negative, between one event to another event, or one behavior to another behavior. Typically, associations can be expressed quantitatively as a degree of likelihood of occurrence of another event or behavior after occurrence of one event or behavior. Insights are typically derived from analysis of empirical data. Insights can also be revealed, strengthened, and verified through hypothesis testing using empirical data. Insight are more robust when obtained in larger, more representative data set compared to smaller, limited data set. The Data Owner, may own Big Data and thus can be in a position to have data and insights useful for others who are unable to collect or analyze the data.

For example, buying book A is one event. Buying book B is another event. Sometimes, buying book A is associated with an increased or decreased likelihood of buying book B, either at individual or population level. This association is an insight. An increased likelihood is called a positive association, or positive correlation. A decreased likelihood is called negative association or negative correlation.

The association may be derived from a causal relationship, a non-causal relationship, or both. For example, reading book A may prompt an impetus to purchase book B, in which case the positive association is a result of a causal relationship between the event of buying book A and the buying the book B. Commercially, this type of causal relationship is often used for merchant to sell related items. For example, if someone bought a new house, the likelihood of the buyer buying furniture is increased compared to the general public. On the other hand, buying book A may not have provoked an interest in book B; rather, buying book A reveals, or identifies the buyer as a type of reader who prefers the types of books to which book B belongs. As a result, the association between the buying book A and book B are not causal, instead the association is reflection of common cause.

The association relationship is valuable for manufacturers, merchants and consumers. Armed with the knowledge, manufacturers may better plan production lines, merchants can target advertisements to a more receptive audience and optimize inventory, and consumer may be relieved from unwanted advertisement bombardment. Availability of insights to manufacturers and represents increased market efficiency and cost saving that can benefit all market participants.

Although Big Data Owners are often in a position to collect sufficient data and detect insights or association, an Insight Provider, i.e., a party in a position to provide insights, does not necessarily have to collect data. For example, an Insight Provider may acquire raw data from a Big Data Owner and perform analysis and gain insights, or acquire insights directly from a Big Data Owner. The Insight Provider may be in a position to sell insights without collecting Big Data by itself. In this application, Data Owner and Insight Provider are used interchangeably to refer to a party who is in a position to provide insight. A Data Seeker is a party who seeks insights from Data Owner or Insight Provider. A Data Seeker typically is a business, group or person that desires to gain insight from Data Owner or Insight Provider. Insights are associations, connections, or relationship between events, occurrence, objects, goods, and services that are sought for Insight Seekers. The followings are some non-exhaustive examples of insights.

In one embodiment, insights can be associations between one good, item, or object (together simplified as goods) and other goods; or one good and a service, or a service and other goods, or a service and other services. For example, a Data Owner may have accumulated sufficient amount of purchasing records and performed analyses so that the Data Owner may predict, in sufficient statistical accuracy, if one goods is first purchased, the degree of likelihood that other goods may be purchased. The first purchased goods is termed primary object, the others goods that showed statistically significant association with the primary object are called associated goods. The same definition applies to service instead of goods.

The insights into the association between a primary object and associated goods can be compared to shopping habit at a population scale. A shopping habit of an individual can be very helpful in predicting what a person going to purchase under conditions such as a prior purchase. When sufficient amount of individual purchasing habits are grouped and properly analyzed, a pattern, or an association of merchandise between a primary object and associated goods can emerge. Both the individual shopping habit and the general association between a target and associated goods or services are valuable to a merchant who sells the goods and services, a manufacturer who produce the goods, and a service provider who provides the services.

In another embodiment, the insights can be psychological profiles. For example, the insight provider may be a large employer who has a data set on many employees' working behavior. Insights can be developed to associate employees with several traits. When a former employee of the large employer seeks employment with a potential employer, the potential employer may wish to know potential traits of the candidate employee in the prior working environment. Here, a primary event is the employee identity. Associated events are the traits that are statistically significantly associated with the candidate employee.

In another embodiment, insights can be a user mobility profile. A user mobility profile is a combination of historic records and predictive patterns of mobile terminals, which serve as fundamental information for mobility management and enhancement of quality of service in wireless networks. Normally, a user mobility profile framework is developed for estimating service patterns and tracking mobile users, including descriptions of location, mobility, and service requirements. However, other service providers may benefit from learning locations (associated events) associated with a client (primary event).

In the following, associations between a primary object and associated goods are discussed. Those skilled in the art will appreciate that other associations are also applicable.

In one embodiment, a store sells a series of goods expressed as $x_1, x_2, \ldots, x_n$. A primary event may be the purchase of an item or good $x_p$. A secondary event is the purchase of another good among as $x_1, x_2, \ldots, x_n$ after purchasing $x_p$. An associated event is a secondary event associated with the purchase of good $x_p$. An equivalent expression is that the primary good is $x_p$, secondary goods are $x_1, x_2, \ldots, x_n$, and associated goods are those secondary goods with an association with the primary good $x_p$. The associations between the primary good $x_p$ and the associated goods among $x_1, x_2, \ldots, x_n$ capture the likelihood between purchasing $x_p$ and purchasing the associated goods among $x_1, x_2, \ldots, x_n$. The store may have collected sufficient sales information to establish such associations, thus becoming a Data Owner with Insight. Another entity, such as another merchant, may desire to obtain such Insight. The other merchant is a Data Seeker, who is interested in paying a fee for the information on associations between primary good $x_p$ and the associated goods among $x_1, x_2, \ldots, x_n$. The Data Owner typically prefers to preserve the privacy of its data and data structure, and the Data Seeker typically prefer to preserve the privacy of its interest and extent of inquiry. Privacy preservation allows a Data Seeker to reveal to a Data Owner only identities of primary object, and in return to receive only identities of associated goods.

In one embodiment, Data Owner gathers data and learns insights into the relationships between a primary good $x_p$ and a group of associated goods expressed as $x_1, x_2, \ldots, x_n$, using a machine-learning algorithm. Upon request from a Data Seeker, Data Owner shares part of the insights with the Data Seeker through a scheme of private set intersection. One example of the private set intersection used is Oblivious Pseudo-Random Functions (OPRF). Other private set intersection algorithms are possible. The degree of insight sharing can be controlled by Data Owner through a pre-defined threshold. The extents of the shared insights can also be specified by the Data Seeker. The Data Seeker has no access to raw data, and Data Owner learns only the primary object, but no other items that the Data Seeker is interested in.

The advantages of sharing insights through a private set intersection protocol are manifolds. First, privacy risks are reduced when a Data Seeker does not enjoy unfiltered access to a Data Owner's data set and data structure. The Data Seeker learns only the recommended association from the Data Owner. Second, novel business and commercial opportunities are enabled. In general, sharing of personal data is highly regulated, and ignoring such limitations is not in the interest of the Data Owner. Sharing insights through a private set intersection alleviates privacy concerns induced by the sharing of personal data. Third, sharing insights through a private set intersection enables a controlled release of data, thus preserving database value. Data Owner may prefer to share data with a Data Seeker only on a need-to-know or pay-to-view basis, or in a limited, controlled, and targeted manner. As a result, the Data Owner may sell different insights to multiple Data Seekers with different information needs and maximize revenue. Lastly, sharing insights fits the needs of most Data Seekers, since most Data Seekers might not have access to Big Data and might not want to deal with the complex and sophisticated data analyses associated with extracting insights from Big Data. Sharing insights through a private set intersection also protects a Data Seeker's interests. Data Seekers may have their own privacy concerns, business secrets, or trade secrets. For example, a Data Seeker may be a potential competitor of a Data Owner and is reluctant to share with the Data Owner anything beyond the primary object. Sharing insights through a private set intersection protocol solve the problem by using an Oblivious Pseudo-Random Functions (OPRF). As a result, Data Owner learns only the primary object from the Data Seeker, thus eliminating the privacy and commercial competition concerns for Data Seeker.

Method and System for a Privacy-Preserving Insight Sharing Via Private Set Intersection In one embodiment, a computer-implemented method for monetizing data is disclosed. A Data Owner learns insights into relationships between one event and other events. Upon a request from a Data Seeker for sharing the insights, the Data Owner may monetize data by sharing the insights in a privacy-preserving way for a fee. To do so, the Data Owner may compute a recommendation based on the input of the Data Seeker, such as a primary merchandise, good, object, service, or event. The Data Owner also selects how many insights are shared with the Data Seeker, for example using a threshold. The threshold can also be restricted based on the input from the Data Seeker. Finally, insights, in the form of associations, are shared with the Data Seeker.

Figure 2:
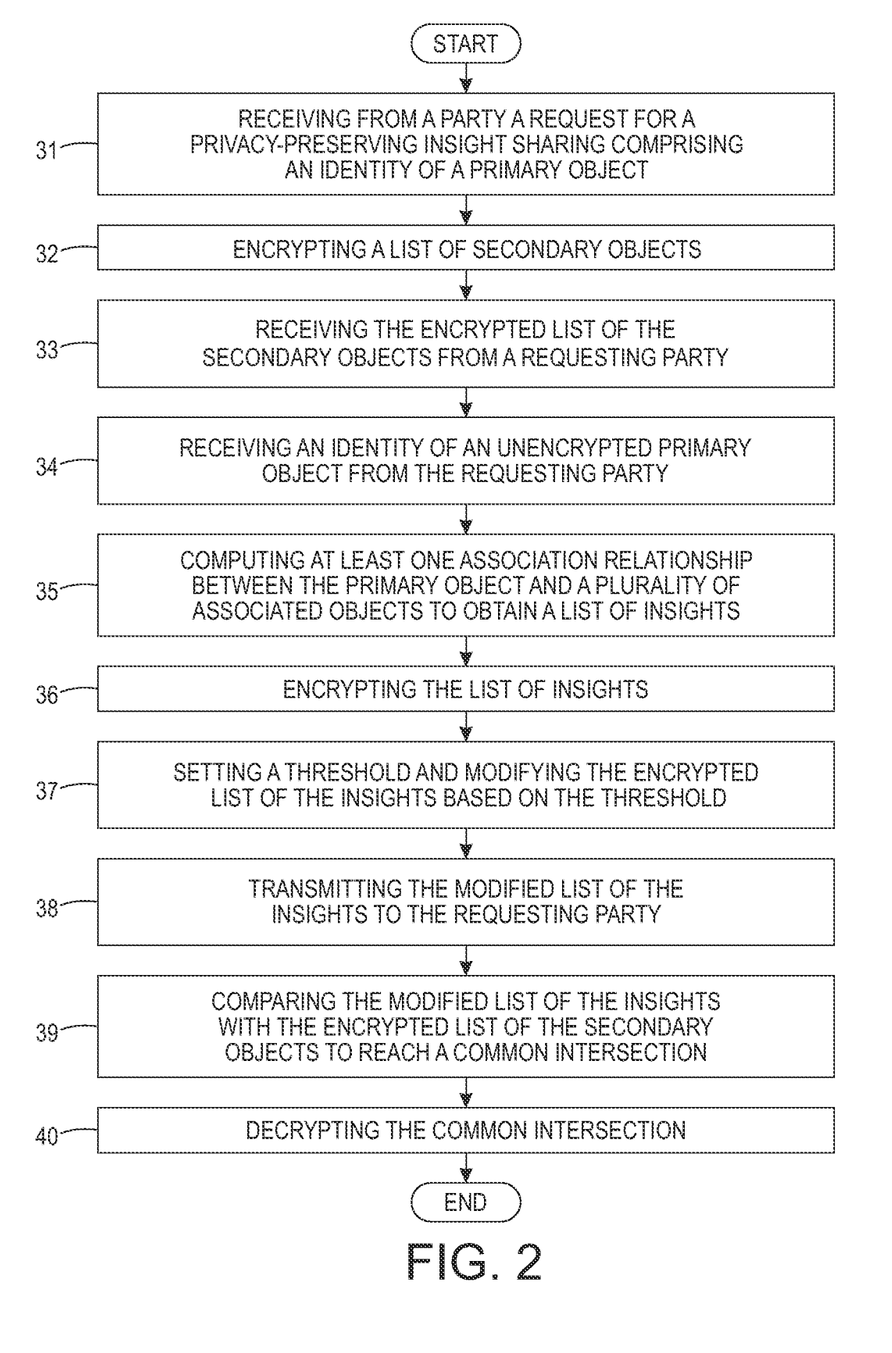
FIG. 2 is a flow diagram showing a method for privacy-preserving insight sharing.

In one embodiment, a computer-implemented method for privacy-preserving insight sharing is disclosed. FIG. 2 is a flow diagram showing a method for privacy-preserving insight sharing. A Data Owner or Insight Provider receives from a Data Seeker or Insight Seeker a request for insights (step 31). The request and the subsequent information enhancing is executed in a privacy-preserving manner. The Data Seeker formulates a list of a plurality of secondary objects. The list of the plurality of the secondary objects is encrypted or obfuscated (Step 32). The encryption can be performed by the insights sharing system 12, a software on the Data Seeker's system, or a third party software. The insights sharing system 12 receives the encrypted list of the secondary objects from the Data Seeker (step 33). The insights sharing system 12 further receives an identity of an unencrypted primary object from the requesting party (step 34). At least one association relationship between the primary object and a plurality of associated objects is computed to obtain a list of insights (step 35). The insights sharing system 12 encrypts or obfuscates the list of the insights (step 36). The insights sharing system 12 further sets a threshold and modifies the encrypted list of the insights based on the threshold (step 37). The modified list of the insights is transmitted to the requesting party (step 38). By comparing the modified list of the insights with the encrypted list of the secondary objects, a common intersection is reached that represents the insights shared by the Data Owner to the Data Seeker (Step 39). Finally, the common intersection is decrypted (step 40).

In another embodiment, a computer-implemented system for privacy-preserving insight sharing is disclosed. The system includes a receiving module configured to receive an identity of a primary object and an obfuscated list of secondary objects from a requesting party; an encryption module configured to modify the obfuscated list of the secondary objects to create a modified obfuscated list of the secondary objects; a sharing module configured to transmit to the requesting party the modified obfuscated list of the secondary objects; an insight computing module configured to compute at least one association relationship between the primary object and associated objects to obtain a list of insights; a threshold module configured to select the list of the insights to obtain a selected list of the insights; the encryption module further configured to obfuscate the selected list of the insights to obtain an obfuscated selected list of the insights; the sharing module further configured to transmit the obfuscated selected list of the insights to the requesting party; and a comparison module configured to provide an intersection between the modified obfuscated list of the secondary objects and the obfuscated selected list of the insights through comparing the modified obfuscated list of the secondary objects and the obfuscated selected list of the insights.

The Private Set Intersection addresses concerns over the privacy and business secret for both the Data Seeker and Data Owner without downgrading the quality of the data. The Data Owner learns from the Data Seeker only the identity of a primary object that the Data Seeker is interested in. The Data Owner computes a list of associated goods based upon the insights into the relationship between the primary object and other objects. Using a privacy set intersection protocol, the Data Owner also receive a list of encrypted secondary goods. The intersecting protocol compares the list of associated goods with the list of encrypted secondary goods and overlapping, or intersecting portion of the goods constitutes a recommendation. The recommendation can be modified through a criterion including strength of association, the numbers of goods in a recommendation, or payment. The recommendation is communicated to the Data Seeker. One example of the privacy set intersection protocols is an Oblivious Pseudo-Random Functions. Thus, the Data Owner and Data Seeker exchange the primary object, a list of encrypted secondary goods, and a list of recommended associated goods, but otherwise will not learn anything more about each other's data.

In still a further embodiment, the list of the recommendation can be ranked according to the strength of association. In a yet further embodiment, the list of recommendation can be filtered through a threshold of strength of the association.

Oblivious Pseudo-Random Functions (OPRF)

OPRF is a two-party protocol that securely computes a pseudo-random function $f\_k(x)$ on key k contributed by a server and input x contributed by a client such that the server learns nothing from the interaction and the client learns only the value $f\_k(x)$. In one embodiment, an OPRF based on RSA algorithm is used for private set intersection. In another embodiment, an OPRF based on Diffie-Hellman algorithm is used for private set intersection. These OPRF are described in detail below. Other OPRFs are possible, and can be used in placed of the OPRF described below.

OPRF Based on RSA Algorithm

Figure 3:
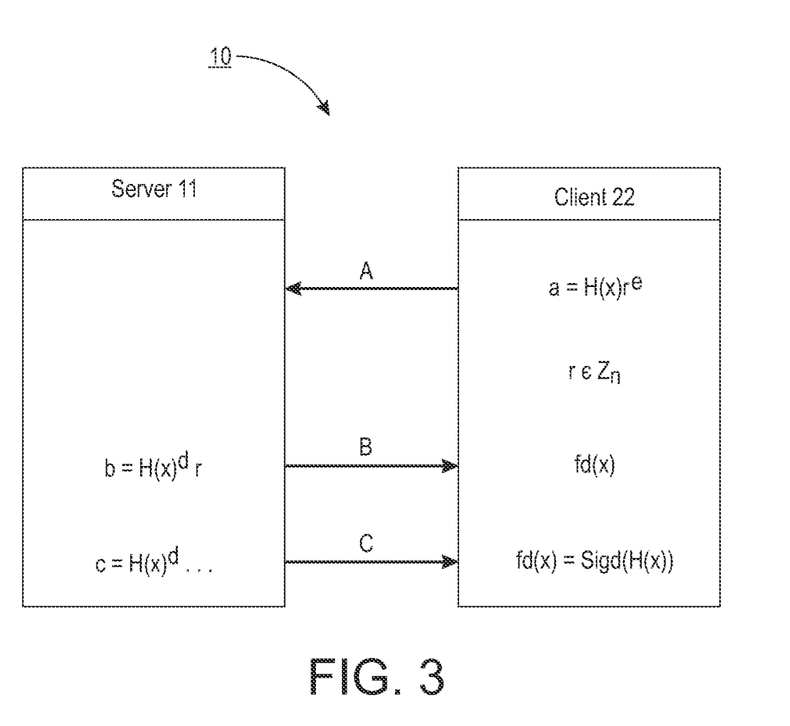
FIG. 3 is a block diagram showing the input and output exchange of the insight sharing system using an Oblivious Pseudo-Random Functions based on RSA algorithm.

In one embodiment, the OPRF is constructed as $f_{d(x)}=\text{sig}_d(H(x))$ where d is the RSA private key held by the Insight Sharing System 12 located on the server 11, and x is an input contributed by a Data Seeker via the Client Software 22, and H is a cryptographic hash function. FIG. 3 is a block diagram showing the input and output exchange of the insight sharing system using an Oblivious Pseudo-Random Functions based on the RSA algorithm.

For an input x from the Data Seeker, a random number r is generated by Client Software 22 under the Data Seeker's control, with r being a random integer in the interval [0, n−1], or $r \in Z_N$; the input x is encrypted in the form of $a = H(x) \cdot r^e$, wherein (n,e) is the RSA public key. The use of r ensures Data Seeker, but not Data Owner, knows the input x;

The Insights Sharing System 12 located on server 11 receives encrypted x in the form of $a = H(x) \cdot r^e$;

the Insights Sharing System 12 located on server 11 decrypts the inputs by computing $s = a^d$, $b = H(x)^d r^{ed}$, wherein d is the RSA private key; performing a module n operation on b, resulting in b (mod n) = $H(x)^d$ (mod n)·$r^{ed}$(mod n) = H$(x)^d \cdot r$(mod n), wherein ed≡1 (mod φ(n)) and φ(n) is Euler's totient function;

the Insights Sharing System 12 transmits the $H(x)^d \cdot r$ to the Client; and the Client under Data Seeker's control computes $$\text{sig}_d(x) = \frac{b}{r},$$

$f_{d(x)} = \text{sig}_d(H(x)) = H(x)^d$.

Thus, the Server 11 does not learn the input x, but the Server 11 can return to Data Seeker an OPRF based on input x in the form of $H(x)^d$.

Applications of OPRF Based on RSA Algorithm

Figure 4:
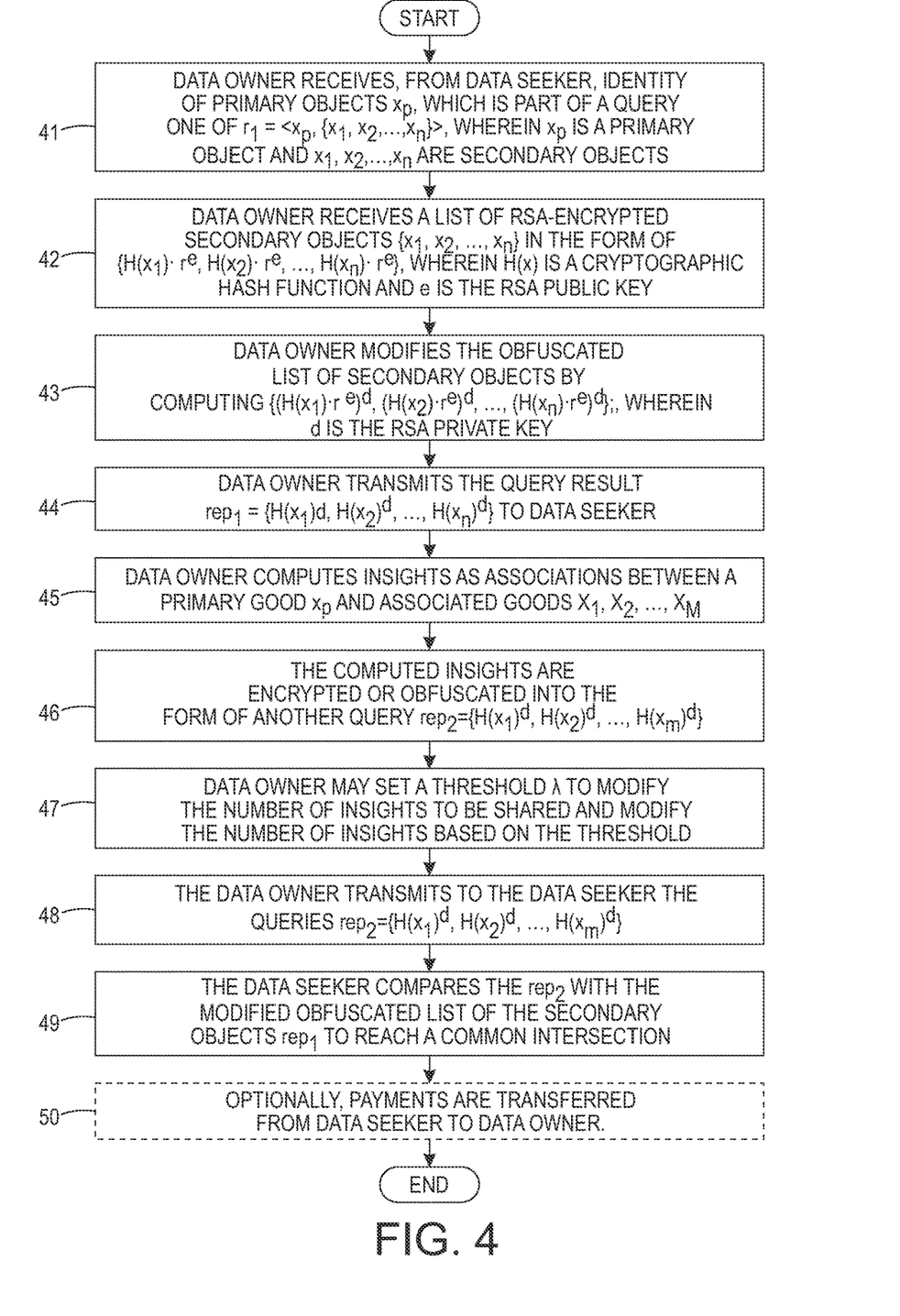
FIG. 4 is a flow diagram showing a method for privacy-preserving insight sharing using the Oblivious Pseudo-Random Function based on RSA algorithm as described with reference to FIG. 3.

In one embodiment, the OPRF scheme can be applied to allow Data Owner sharing insight with Data Seeker for compensation, without revealing the underlying data and data structure for Data Owner, and without revealing the list of inquired item to Data Owner. FIG. 4 is a flow diagram showing a method for privacy-preserving insight sharing using the Oblivious Pseudo-Random Function based on RSA algorithm described with reference to FIG. 3. The steps are described in the following.

A Data Owner receives from the Data Seeker the identity of a primary objects $x_p$, which is part of a query one of $r_1 = \langle x_p, \{x_1, x_2, \ldots, x_n\} \rangle$. The $x_1, x_2, \ldots, x_n$ are secondary objects that the Data Seeker is interested in (step 41).

The Data Owner also receives the secondary objects $\{x_1, x_2, \ldots, x_n\}$ in an encrypted form $\{H(x_1) \cdot r^e, H(x_2) \cdot r^e, \ldots, H(x_n) \cdot r^e\}$ following the OPRF protocol described above, wherein H(x) is a cryptographic hash function, r is a random number, and e is the RSA public key of the Data Owner (step 42).

The Data Owner modifies the received secondary objects and obtains $\text{rep}_1 = \{H(x_1)^d \cdot r, H(x_2)^d \cdot r, \ldots, H(x_n)^d \cdot r\}$ through the OPRF based on RSA algorithm, wherein H(x) is the cryptographic hash function, and d is the RSA private key held by the Server 11 (step 43).

The Data Owner transmits the modified query result $\text{rep}_1 = \{H(x_1)^d \cdot r, H(x_2)^d \cdot r, \ldots, H(x_n)^d \cdot r\}$ to the Data Seeker (step 44).

The Data Owner computes insights as associations between the primary good $x_p$ and associated goods $x_1, x_2, \ldots, x_m$ (step 45). For example, $x_1 \rightarrow \{x_2, x_5, x_{17}, x_{45}, x_{101}\}$, $x_2 \rightarrow \{x_1, x_5, x_{45}, x_{221}\}$. In other words, each primary good is associated with a number of associated objects.

The computed insights are encrypted or obfuscated into the form of another query $\text{rep}_2 = \{H(x_1)^d, H(x_2)^d, \ldots, H(x_m)^d\}$ (step 46).

The Data Owner may set a threshold λ to modify the number of insights to be shared and modify the number of insights based on the threshold (step 47).

The Data Owner transmits to the Data Seeker in the forms of $\text{rep}_2 = \{H(x_1)^d, H(x_2)^d, \ldots, H(x_m)^d\}$ (step 48).

The Data Seeker compares the modified list of the insights $\text{rep}_2$ with the obfuscated list of the secondary objects $\text{rep}_1$ to reach a common intersection (step 49).

Optionally, payments are transferred from Data Seeker to Data Owner (step 51). Typically, charges can be based on the number of queries, amount of insights shared, cost of the content, and other factors. Payments may be processed before, during and after the data sharing.

The sharing of insights between the Data Owner and Data Seeker can be made more advantageous for either or both parties through a controlled, graded, or targeted search or release. The controlled, graded, or targeted search or release of insights can be achieved by appropriately selecting a threshold λ.

One embodiment involves placing a threshold λ on the association strength. For example, the Data Seeker may request to learn from the Data Owner only objects showing association larger than a specific threshold with the primary subjects $x_p$, in order to stock the most relevant items; In another example, the Data Seeker may be interested in the items showing the intermediate level of association, because Data Seeker already knows those items with strongest association through common knowledge or business experience; alternatively, the Data Seeker may be interested in the items showing the lowest discernable positive association, because the Data Seeker may be interested in investing an item through cultivating and developing stronger ties with the item $x_p$; still alternatively, Data Seeker may be interested only in item that negatively associated the $x_p$, for purposes such as optimizing inventory, or avoiding turning away customers who have already decided to purchase the item $x_p$. Other scenarios are possible.

In another embodiment, the Data Owner may also place a threshold on the association strength. Depending on the market positions, the Data Owner may limit the disclosure based on the strength of association between a primary object and an associated object. For example, Data Owner may restrict a competitor from accessing to insights on strong associations.

Another embodiment involves placing a threshold λ on the number of associated objects to be shared. The threshold can be placed by Data Owner or Data Seeker. For example, a Data Owner may prefer capping a potential competitor's knowledge. Alternatively, the Data Seeker may limit the number of associations because the Data Seeker must pay a per association fee.

By providing the options to allow Data Owner and Data Seeker to decide on a variety of insight sharing levels, Data Owner and Data Seeker can benefit through lowered cost for buyer Data Seeker, higher demand for seller Data Owner, and reduced risk of privacy breaches for both.

In still another embodiment, the controlled, graded, or targeted search or release of data can be achieved through limiting other factors. These factors include, but are not limited to: geographical location, time, season, and population demographics. For examples, a local store may be interested in the association specifically obtained from a limited geographic area encompassing the store. A merchant preparing for a specific season or holiday may be interested in the seasonal or holiday-specific associations. A store catering for a particular demographic may prefer those associations that are specific to the demographic. Other factors are possible.

The approaches embodied in this invention can usher in novel business possibilities for Big Data owners. First, only insights are shared, the data and data structure remain within the Data Owner, thus value of the data is not diluted with sharing and privacy risk is minimized. Second, the method allows Data Seeker to craft queries, thus guaranteeing that Data Seekers only improve their knowledge on what they intend to learn if Data Owner choose not to reveals knowledge. Third, the method protects the information that Data Seekers provide, so that Data Owner does not learn anything about Data Seeker's data. Fourth, the method provides Data Owner with control over the amount of disclosure of insights, and provides Data Seeker with control over broadness and amount of the search, thus making the information service flexibly adaptable to individual clients with different needs on information depths and quantity. Thus this approach can help bridge the potential digital divide between isolated Big Data hubs and other Data Seekers, by enabling novel marketplaces centered on Big Data through preserving Data Owner's value, reducing Data Owner's risk, protecting Data Seeker's commercial information and trade secrets, and foremost, lower the price of the commodity while still satisfying the needs of buyer.

The Data Owner may have acquired insights through one or more methods. The methods include maintaining an inventory of the objects, selling the objects, and analyzing the purchase pattern; collecting data from outside sources; buying data from other Data Owners, and researching and hypothesis testing. The data analyses requisite for gaining the insights may be performed by the Data Owner or agents and contractors of the Data Owner. Insights can become a recommendation when shared with a Data Seeker in exchange of compensation. In one embodiment, the Data Owner can compute insights, or recommendations, using its own machine learning algorithm that provide for each object a series of related objects that might be interesting for customers.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented method for privacy preserving insight sharing, the method comprising:
   maintaining, by one or more servers, at least one data structure for a data owner comprising primary objects each comprising a first occurring event, service or good and associated objects each comprising a further event, service or good occurring after the primary object and associated with one or more of the primary objects; and
   allowing access to the maintained data while preserving privacy of the data owner, comprising:
      receiving, by at least one of the one or more servers, a query comprising an identity of one of the primary objects and an obfuscated list of secondary objects each comprising a further event, service or good occurring after one of the primary objects from a requesting party;
      comparing the query to the primary objects of the data owner;
      identifying one of the primary objects maintained for the data owner that matches the identity of the primary object in the query from the requesting party;
      generating a list of relationships, comprising:
         learning, by a machine-learning algorithm, insights into relationships between the primary objects and the associated objects;
         computing, using the machine-learning algorithm, association relationships between the matching primary object and two or more of the associated objects for that matching primary object to obtain the list of relationships; and
      modifying the list of relationships based on a number of the insights to be shared based on a predefined threshold;
      obfuscating, by at least one of the one or more servers, the modified list of the relationships comprising encrypting the associated objects of the data structure for the matching primary object and the relationships to the matching primary object;
      transmitting the obfuscated list of the relationships to the requesting party; and
      controlling access to the data by the requesting party by computing a set intersection between the obfuscated list of the secondary objects and the obfuscated list of the relationships as results of the query.

2. A method according to claim 1, wherein the secondary objects and the obfuscated list of the relationships are obfuscated via an Oblivious Pseudo Random Function.

3. A method according to claim 2, wherein the Oblivious Pseudo Random Function is based on at least one of RSA algorithm, Diffie-Hellman algorithm, or a hashing algorithm.

4. A method according to claim 1, further comprising the steps of:
   obfuscating the list of the secondary objects by computing $\{H(x1) \cdot r^e, H(x2) \cdot r^e, \ldots, H(xn) \cdot r^e\}$;
   modifying the obfuscated list of the secondary objects by computing $\{(H(x1) \cdot r^e)^d, (H(x2) \cdot r^e)^d, \ldots, (H(xn) \cdot r^e)^d\}$; and
   transmitting the obfuscated list of the relationships to the requesting party in the form of $\{H(x1)^d, H(x2)^d, \ldots, H(xm)^d\}$,
   wherein $H(x)$ is the cryptographic hash function, e is the public key of a RSA algorithm, d is a the private key of the RSA algorithm, r is a random integer, the x1, x2, ..., xn are the secondary objects, and the x1, x2, ..., xm constitute the list of the relationships.

5. A method according to claim 1, further comprising:
   receiving a payment from the requesting party in exchange for the obfuscated list of the relationships.

6. A method according to claim 1, further comprising the step of:
   selecting the list of the relationships based on at least one of a number of the relationships, a specification from the receiving party, and a strength of the association relationship between the primary object and the associated objects.

7. A method according to claim 1, wherein the secondary objects comprise a mathematical description of at least one of goods, services, activities, and events.

8. A method according to claim 1, further comprising: computing the relationships by the steps of:
maintaining an inventory of goods;
obtaining shopping data on the inventory of the goods; and
computing an association relationship between purchasing one good and purchasing another good based on the shopping data.

9. A method according to claim 8, wherein the association is positive or negative.

10. A non-transitory computer readable storage medium storing code for executing on a computer system to perform the following steps:
maintaining at least one data structure for a data owner comprising primary objects each comprising a first occurring event, service or good and associated objects each comprising a further event, service or good occurring after the primary object and associated with one or more of the primary objects; and
allowing access to the maintained data while preserving privacy of the data owner, comprising:
receiving a query comprising an identity of one of the primary objects and an obfuscated list of secondary objects each comprising a further event, service or good occurring after one of the primary objects from a requesting party;
comparing the query to the primary objects of the data owner;
identifying one of the primary objects maintained for the data owner that matches the identity of the primary object in the query from the requesting party;
generating a list of relationships, comprising:
learning, by a machine-learning algorithm, insights into relationships between the primary objects and the associated objects;
computing, using the machine-learning algorithm, association relationships between the matching primary object and two or more of the associated objects for that matching primary object to obtain the list of relationships; and
modifying the list of relationships based on a number of the insights to be shared based on a predefined threshold;
obfuscating the list of the relationships comprising encrypting the associated objects of the data structure for the matching primary object and the relationships to the matching primary object;
transmitting the obfuscated list of the relationships to the requesting party; and
controlling access to the data by the requesting party by providing a set intersection between the obfuscated list of the secondary objects and the obfuscated list of the relationships as a result of the query by enabling the requesting party to compare the obfuscated list of the secondary objects and the obfuscated list of the relationships.

11. A computer-implemented system for privacy-preserving insight sharing, comprising:
a storage device to maintain data for a data owner comprising primary objects each comprising a first occurring event, service or good, and associated objects for each of the primary objects, each associated object comprising a further event, service or good occurring after that primary object; and a server comprising a central processing unit, memory, an input port to receive the uncoded concepts and reference concepts from the database, and an output port wherein the central processing unit is configured to:
allow access to the maintained data while preserving privacy of the data owner, comprising:
receive a query comprising an identity of one of the primary objects and an obfuscated list of secondary objects each comprising a further event, service or good occurring after one of the primary objects from a requesting party;
compare the query to the primary objects of the data owner;
identify one of the primary objects maintained for the data owner that matches the identity of the primary object in the query from the requesting party;
generate a list of relationships, comprising:
learn, by a machine-learning algorithm, insights into relationships between the primary objects and the associated objects;
compute, using the machine-learning algorithm, association relationship between the matching primary object and two or more of the associated objects for that matching primary object to obtain the list of relationships; and
modify the list of relationships based on a number of the insights to be shared based on a predefined threshold;
obfuscate the modified list of the relationships comprising encrypt the associated objects of the data structure for the matching primary object and the relationships to the matching primary object;
transmit the obfuscated list of the relationships to the requesting party; and
control access to the data by the requesting party by computing a set intersection between the obfuscated list of the secondary objects and the obfuscated list of the relationships as results of the query.

12. A system according to claim 11, wherein an Oblivious Pseudo Random Function is employed.

13. A system according to claim 12, wherein the Oblivious Pseudo Random Function is based on at least one of RSA algorithm, Diffie-Hellman algorithm, and a hashing algorithm.

14. A system according to claim 11, wherein the central processing unit performs at least one of obfuscates the list of the secondary objects by computing $\{H(x1)\cdot r^e, H(x2)\cdot r^e, \ldots, H(xn)\cdot r^e\}$ modifies the obfuscated list of the secondary objects by computing $\{(H(x1)\cdot r^e)^d, (H(x2)\cdot r^e)^d, \ldots, (H(xn)\cdot r^e)^d\}$ transmits the obfuscated list of the relationships to the requesting party in the form of $\{H(x1)^d, H(x2)^d, \ldots, H(xm)^d\}$,
wherein $H(x)$ is the cryptographic hash function, e is the public key of a RSA algorithm, d is a the private key of the RSA algorithm, r is a random integer, the $x_1, x_2, \ldots, x_n$ are the secondary objects, and the $x_1, x_2, \ldots, x_m$ constitute the list of the relationships.

15. A system according to claim 11, wherein a payment from the requesting party is received in exchange for the obfuscated list of the relationships.

16. A system according to claim 11, wherein the central processing unit adjusts a threshold for selecting the list of the relationships based on at least one of a number of the relationships, a specification from the receiving party, and a strength of the association between the primary object and the associated objects.

17. A system according to claim 11, wherein the central processing unit computes the relationships by the steps of:

maintaining an inventory of goods;
obtaining shopping data on the inventory of the goods; and
computing an association relationship between purchasing one good and purchasing another good based on the shopping data.

18. A system according to claim 17, wherein the association relationship is positive or negative.

\* \* \* \* \*